(12) United States Patent
Zhao et al.

(10) Patent No.: US 11,272,381 B2
(45) Date of Patent: Mar. 8, 2022

(54) PATTERN RECOGNITION AND CLASSIFICATION OF PACKET ERROR CHARACTERISTICS FOR MULTI-USER MULTIPLE INPUT MULTIPLE OUTPUT (MU-MIMO) OPTIMIZATION

(71) Applicant: Cisco Technology, Inc., San Jose, CA (US)

(72) Inventors: Qing Zhao, Fremont, CA (US); Benjamin Jacob Cizdziel, San Jose, CA (US); Gautam Dilip Bhanage, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 89 days.

(21) Appl. No.: 16/387,825

(22) Filed: Apr. 18, 2019

(65) Prior Publication Data
US 2020/0336922 A1 Oct. 22, 2020

(51) Int. Cl.
*H04W 24/02* (2009.01)
*H04B 7/0452* (2017.01)
*H04W 84/12* (2009.01)
*H04W 24/08* (2009.01)

(52) U.S. Cl.
CPC .......... *H04W 24/02* (2013.01); *H04B 7/0452* (2013.01); *H04W 24/08* (2013.01); *H04W 84/12* (2013.01)

(58) Field of Classification Search
CPC ..... H04W 24/02; H04W 84/12; H04W 24/08; H04B 7/0452
See application file for complete search history.

(56) References Cited

U.S. PATENT DOCUMENTS

| 7,315,573 | B2 | 1/2008 | Lusky et al. | |
|---|---|---|---|---|
| 9,113,371 | B2 * | 8/2015 | Sun | H04L 5/0035 |
| 9,985,708 | B2 | 5/2018 | Shapira et al. | |
| 10,637,544 | B1 * | 4/2020 | Shattil | H04B 7/0413 |

(Continued)

OTHER PUBLICATIONS

Sun, Haoran et al. "Learning to Optimize: Training Deep Neural Networks for Wireless Resource Management"; Information Theory (Oct. 25, 2017) 32 pages.

(Continued)

*Primary Examiner* — Christopher P Grey
(74) *Attorney, Agent, or Firm* — Merchant & Gould P.C.

(57) ABSTRACT

Pattern recognition and classification of packet error characteristics for Multi-user Multiple Input Multiple Output (MU-MIMO) optimization may be provided. First, a packet error characteristic data of a channel for a Downlink (DL) Multi-user (MU) group may be received. Next, the received packet error characteristic data may be provided as input data to a classifier model. Then, in response to providing the received packet error characteristic data as the input data to the classifier model, output data may be received from the classifier model. The output data may indicate at least one probability value corresponding to at least one channel effect. An optimization for improving performance of DL MU-MIMO in the presence of the at least one channel effect may then be performed when the at least one probability value is above or below a predetermined level.

20 Claims, 6 Drawing Sheets

(56) References Cited

U.S. PATENT DOCUMENTS

| | | | |
|---|---|---|---|
| 2014/0269964 A1* | 9/2014 | Du | H04B 7/0452 375/267 |
| 2015/0245358 A1* | 8/2015 | Schmidt | H04L 43/0888 370/329 |
| 2016/0143043 A1* | 5/2016 | Chendamarai Kannan | H04L 1/0002 370/329 |
| 2016/0345343 A1* | 11/2016 | Elsherif | H04W 72/1289 |
| 2017/0195895 A1* | 7/2017 | Ponnuswamy | H04W 24/02 |
| 2017/0251392 A1* | 8/2017 | Nabetani | H04W 72/085 |
| 2020/0336922 A1* | 10/2020 | Zhao | H04B 7/0452 |

OTHER PUBLICATIONS

Veira, J. "Algorithms and Proofs of Concept for Massive MIMO Systems Lund: The Department of Electrical and Information Technology"; Lund University Publications (2017) 255 pages.

\* cited by examiner

PATTERN RECOGNITION AND CLASSIFICATION OF PACKET ERROR CHARACTERISTICS FOR MULTI-USER MULTIPLE INPUT MULTIPLE OUTPUT (MU-MIMO) OPTIMIZATION

TECHNICAL FIELD

The present disclosure relates generally to pattern recognition and classification of packet error characteristics.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
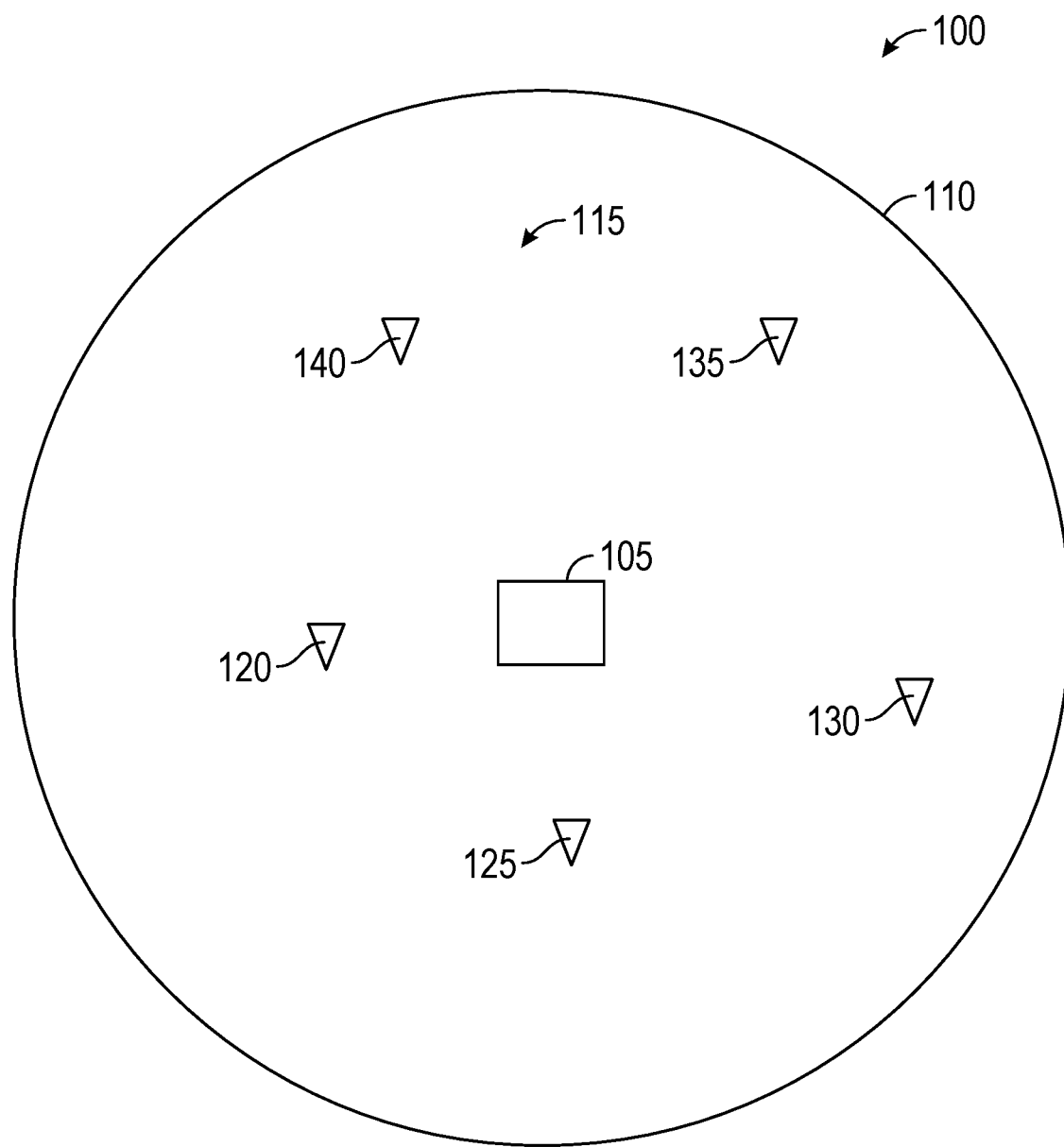
FIG. 1 is a block diagram of an operating environment.

Pattern recognition and classification of packet error characteristics for Multi-user Multiple Input Multiple Output (MU-MIMO) optimization may be provided. First, a packet error characteristic data of a channel for a Downlink (DL) Multi-user (MU) group may be received. Next, the received packet error characteristic data may be provided as input data to a classifier model. Then, in response to providing the received packet error characteristic data as the input data to the classifier model, output data may be received from the classifier model. The output data may indicate at least one probability value corresponding to at least one channel effect. An optimization for improving performance of DL MU-MIMO in the presence of the at least one channel effect may then be performed when the at least one probability value is above or below a predetermined level.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multi-user Multiple Input Multiple Output (MU-MIMO) may comprise a wireless communications process that may allow multiple devices (i.e., client devices) to either transmit or receive at the same time using the same channel. Downlink MU-MIMO (DL MU) (i.e., an Access Point (AP) transmitting to multiple clients) may be susceptible to channel effects because reception of a DL MU frame may depend on a receiving client device being subjected to minimal interference from DL MU frames transmitted to other client devices. Similarly, DL MU may also be dependent on a geolocation of client devices in the DL MU group, and the robustness of successful DL MU transmissions may be proportional to the number of additional Transmit (TX) antennas that a transmitter may use over the number of streams or client devices being transmitted to (e.g., eight TX antennas transmitting three streams to three clients may be more robust than eight TX antennas transmitting seven streams to seven client devices).

Due to the sensitive nature of DL MU, optimization processes may be effective to maximize its performance. While it may be possible to use physical measurements and Digital Signal Processing (DSP) to classify channel effects to determine actions for optimization, these may be computationally complex to implement and may require special hardware. Instead, with embodiments of the disclosure, processes may classify channel effects by recognizing patterns in Media Access Control (MAC) level packet error statistics and this classification may be used to accordingly take different actions for DL MU optimization.

Embodiments of the disclosure may comprise a system that leverages machine learning to classify observed packet error characteristics into a set of known channel effects and make optimizations based on that classification to improve DL MU performance. An input to a classifier model may comprise a packet error characteristic observed by an Access Point (AP) from DL MU transmissions to its clients. Based on the observed packet error characteristic along with other inputs, the classifier model may identify the DL MU transmissions as being impacted by one or more channel effects. Machine learning may be used to train the classifier model with different training processes for classification of each channel effect. Expected patterns may also be preprogrammed into the classifier model to provide a starting point for the classifier model or to allow the process to be implemented without machine learning.

Once the classifier model decides which of the channel effects may be present, DL MU optimizations may be made based on the classification of the channel effects. Each channel effect may be mapped to optimization processes that may be suitable for improving the DL MU performance in the presence of the channel effect. These optimization processes may be performed by an appropriate module that the AP may use for DL MU, for example, an MU grouping module, an MU rate control module, and a transmit (TX) beamforming module.

While embodiments of the disclosure may use machine learning to classify the channel effect, in other embodiments, additional levels of machine learning may be used. These additional levels of machine learning may be used to fine tune the optimizations for each case for increased effectiveness, by observing and recording the degree of improvement in packet error characteristic and throughput following the optimization and using that history to influence future optimization decisions.

To improve effectiveness, multiple sites and/or deployments may be leveraged to expand the data set provided to the machine learning process and to share its outcomes.

FIG. 1 shows an operating environment 100. As shown in FIG. 1, operating environment 100 may comprise an Access Point (AP) 105, a coverage area 110, and a plurality of client devices 115. Coverage area 110 may illustrate the coverage area of AP 105. Plurality of client devices 115 may comprise a first client device 120, a second client device 125, a third client device 130, a fourth client device 135, and a fifth client device 140. Plurality of client devices 115 may comprise a DL MU group that may receive data from AP 105 using the same channel. Each one of plurality of client devices 115 may comprise, but are not limited to, a cable modem, a cellular base station, a tablet device, a mobile device, a smart phone, a telephone, a remote control device, a set-top box, a digital video recorder, an internet of things (IoT) device, a personal computer, a network computer, a mainframe, a router, or other similar microcomputer-based device.

AP 105 may use beamforming. Beamforming may comprise a signal processing technique that may be used in sensor arrays for directional signal transmission or reception. When using beamforming, AP 105 may need to know the relative position of the receivers (i.e., plurality of client devices 115). AP 105 may learn relative positions by sounding plurality of client devices 115, for example, by sending out sounding frames comprising independent signals from each of its antennas, and then each of the plurality of client devices 115 may respond with a matrix indicating how well it heard the signal from each antenna. Based on this matrix data, AP 105 may compute the relative position of each of the plurality of client devices 115, and the phase offsets on each of its antennas required to maximize constructive interference at each of the plurality of client devices 115.

Figure 2:
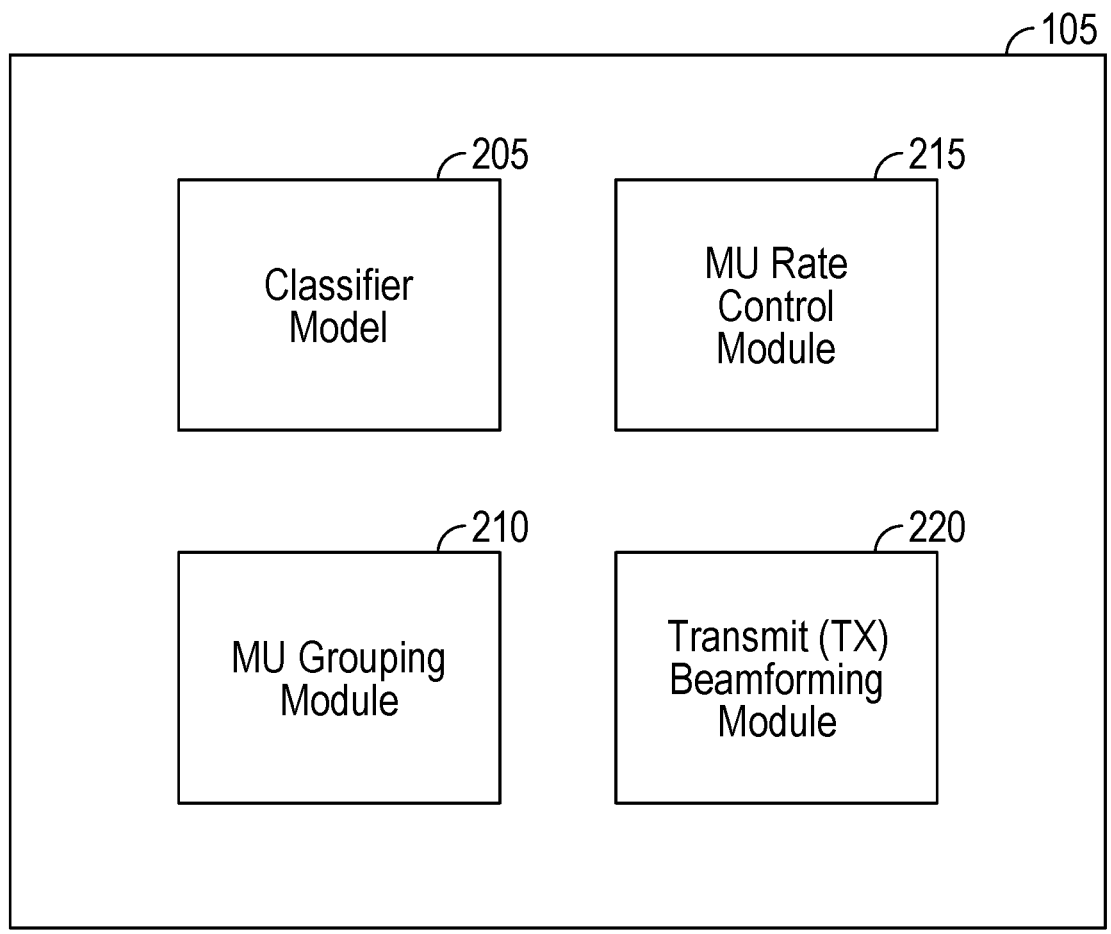
FIG. 2 is a block diagram of an Access Point (AP)

FIG. 2 is a block diagram illustrating AP 105 of FIG. 1 in more detail. As will be described in greater detail below, AP 105 may comprise a classifier model 205, a Multi-user (MU) grouping module 210, an MU rate control module 215, and a Transmit (TX) beamforming module 220. Elements of operating environment 100 (i.e., AP 105, plurality of client devices 115, classifier model 205, MU grouping module 210, MU rate control module 215, and TX beamforming module 220) may be practiced in hardware and/or in software (including firmware, resident software, micro-code, etc.) or in any other circuits or systems. Elements of operating environment 100 may be practiced in electrical circuits comprising discrete electronic elements, packaged or integrated electronic chips containing logic gates, a circuit utilizing a microprocessor, or on a single chip containing electronic elements or microprocessors. Elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 6, elements of operating environment 100 may be practiced in a computing device 600.

As stated above DL MU may be susceptible to channel effects. These channel effects may comprise, but are not limited to: i) high Doppler shift (low channel coherence time (e.g. due to a client device moving)); ii) bursty interference; iii) slow fading, white noise, and/or persistent interference); and poor group selection (i.e., geolocation of clients in DL MU group). As shown in Table 1, each example channel effect is listed below, with an expected pattern (i.e., which may encapsulate any secondary inputs other than the packet error characteristic), possible classifier model training processes for the corresponding channel effects, and potential optimizations to perform in the channel effect's presence.

TABLE 1

|  | High Doppler Shift | Bursty Interference | Slow Fading/White Noise/Persistent Interference | Poor Group Selection |
|---|---|---|---|---|
| Expected Patterns | Observe low packet errors right after sounding and increasing/high packet errors shortly after sounding; packet error rate to known static client devices or sensors increases much more | Observe distinct time chunks of high packet errors; observe instance where entire interval after sounding has high packet errors due to bursty interference occurring | Irregular/random packet error patterns. | Packet error rate reduces drastically when new client is added or swapped into DL MU group. |

TABLE 1-continued

| | High Doppler Shift | Bursty Interference | Slow Fading/White Noise/Persistent Interference | Poor Group Selection |
|---|---|---|---|---|
| | slowly after sounding. | during sounding. | | |
| Possible Classifier Model Training Process | Walk around with client devices for supervised learning. | Inject bursty interference for supervised learning. | Inject white noise or persistent interferer or deliberately place client in location with slow fading for supervised learning. | Transmitting to different DL MU group combinations and observing packet error characteristic. |
| Potential Optimizations | Reduce sounding interval; test client devices in the DL MU group with single user transmissions to determine ones with high Doppler shift and swap/remove them from the group. | Prevent dropping Modulation Coding Scheme (MCS) or number of DL MU streams/users (because general packet error rate should be acceptable when interferer is not present); schedule different group or resound if bursty interference occurred during sounding. | Drop number of MU streams/users; test clients in the DL MU group with single user transmissions and remove/swap clients from group that experience high levels of this effect. | Adjust identity of users in group; adjust number of users in group. |

Figure 3:
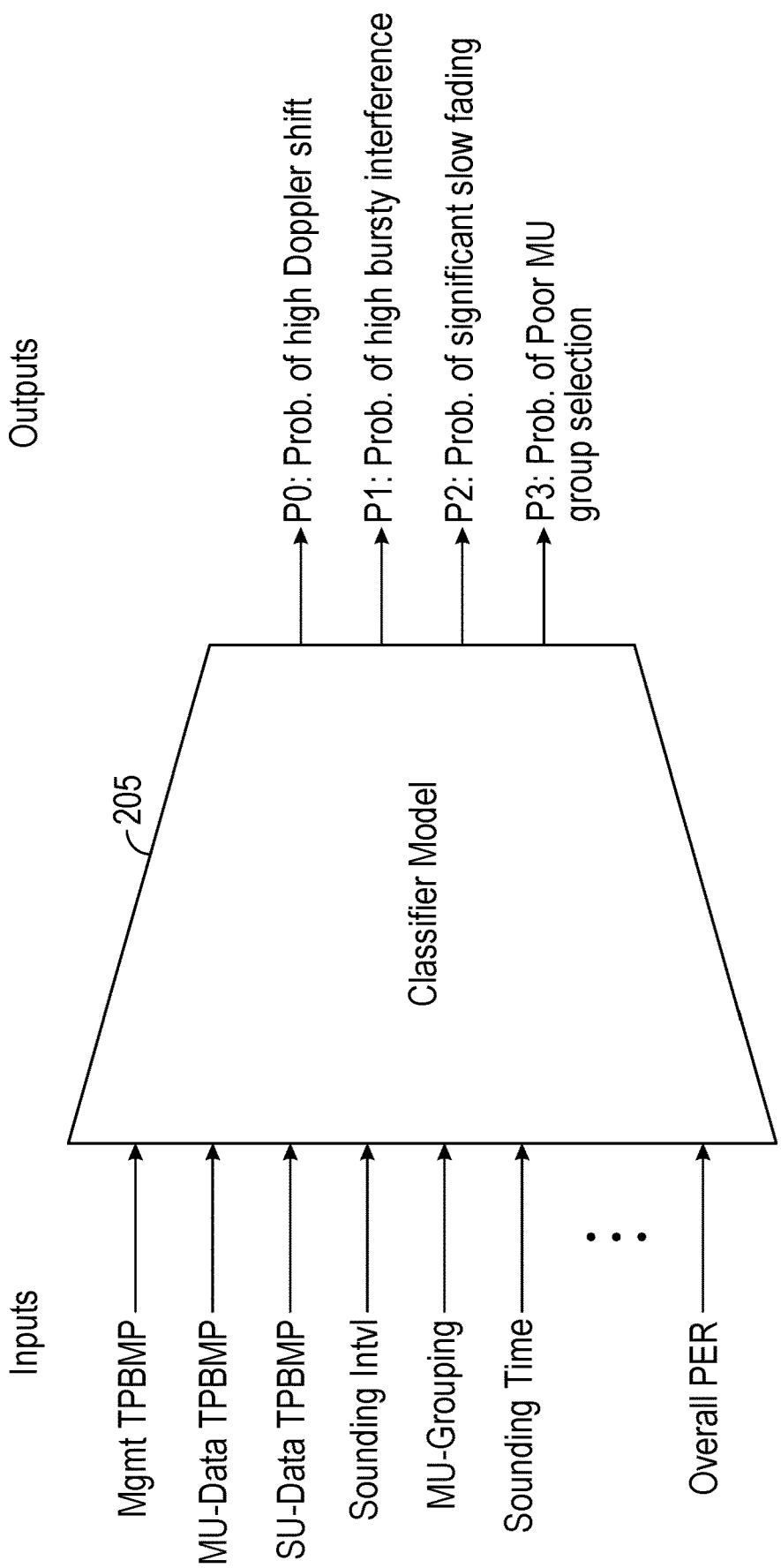
FIG. 3 illustrates a classifier model.

Before classifying observed packet error characteristics into a set of known channel effects and making optimizations based on that classification to improve DL MU performance, classifier model 205 may be trained. As shown in FIG. 3, the inputs for classifier model 205 may be responsible for providing enough dimensions of information so that classifier model 205 may be able to classify different events seen on the channel. Inputs for classifier model 205 may comprise the sounding interval, sounding time, and MU grouping information, which may be known by AP 105 because AP 105 may control them. In addition, an overall Packet Error Rate (PER) may be used as an input for classifier model 205. Overall PER may be calculated by AP 105 from Acknowledgements (ACKs) received from plurality of client devices 115. These may be normalized and fed to classifier model 205.

Figure 4:
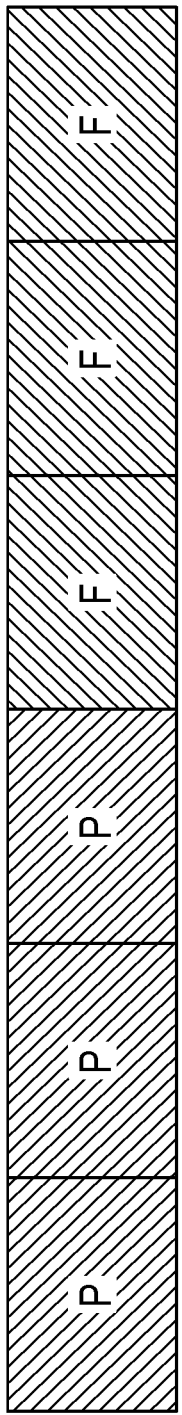
FIG. 4 illustrates packet loss.
Figure 4:
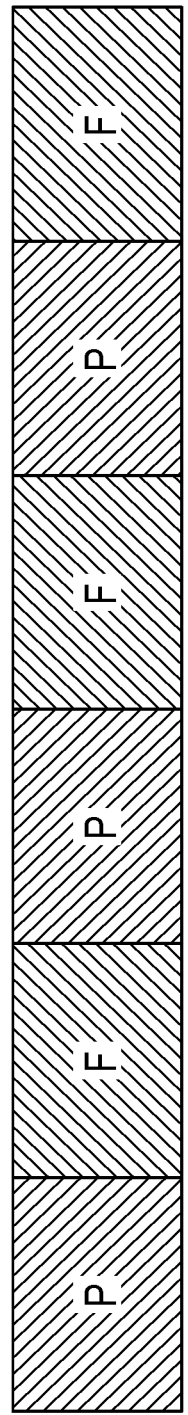

Embodiments of the disclosure may also use Timed PER Bitmap (TPBMP) metrics as input used to train classifier model 205. When only PER is used, the resolution of the information used to train classifier model 205 may lose some details. FIG. 4 illustrates this issue using two cases of packet failures: a Case 1; and a Case 2. Case 1 illustrates consecutive successes followed by consecutive failures (i.e., showing a pattern of burstiness in the channel). Case 2 illustrates intermittent packet loss. If only the PER were used as an input metric, Case 1 and Case 2 may both show 50% error rate. This may mask out significant important information about the packet loss characteristics. In order to improve the information captured as inputs for classifier model 205, while not requiring significant computing capabilities, embodiments of the disclosure may use TPBMP metrics.

The TPBMP metric may capture the following aspects of packet loss: i) packet loss rate itself; ii) burstiness in packet loss; and iii) the timing associated with the packet loss. The TPBMP may be generated by windowing time periods (e.g., between two soundings) into fairly granular slots. For example, for each of these slots, the following may be marked: i) PER State 0: there was a successful packet transmission (measured at the MAC protocol data unit (MPDU) level); ii) PER State 1: there was a failure in packet transmission; and iii) PER State 2: there was no transmission.

To indicate each of these states, two bits of information may be used. Hence, as shown in FIG. 4, a value of 0, 1, or 2 may be assigned for each of the slots W0, W1, ... Wn. If there is more than 1 MPDU transmission in slot Wi, the average PER in that slot may be used to determine the value. For example, if a system wide TPBMP window of 60 ms, with 3 slots of 20 ms each is used, then if there is a significant packet loss in W0 and W1, while success in W2, then a TPBMP metric may comprise (1,1,0). This may be represent as a single concatenated number fed into classifier model 205 as 110=0x6E. As another example, where there are no transmissions, a TPBMP metric may comprise 222=0xDE. The TPBMP metrics may be normalized before being fed into classifier model 205. Using the TPBMP metric, classifier model 205 may be able to analyze the different aspects of the PER (e.g., timing, PER itself, and burstiness) while relying on the encoding of the input. The TPBMP metric may be calculated separately for management frames, MU-data, and Single User (SU)-data, each being separately fed into classifier model 205.

As shown in FIG. 3, the output of classifier model 205 may comprise a vector of probabilities {P0, P1, . . . . Pn} that may indicate the likelihood of an event occurring. This probability vector may be computed periodically for all the client devices (e.g., plurality of client devices 115) and may be used to control the nature of other modules (e.g., MU grouping module 210, MU rate control module 215, and TX beamforming module 220) in AP 105. For example, the outputs of the probability vector may be as follows: i) P0: Probability of high Doppler shift; ii) P1: Probability of high bursty interference; iii) P2: Probability of significant amount of slow fading, white noise, and/or persistent interference (listed in FIG. 3 as "slow fading"); and iii) P3: Probability of poor MU group selection. Each of these probability outputs may be mapped as feedback to independent modules in AP 105 that may perform the "potential optimizations" listed in TABLE 1. For example, P0 may provide feedback to MU grouping module 210 and TX beamforming module 220 of AP 105. P1 may provide feedback to MU rate control module 215 and TX beamforming module 220 of AP 105. P2 may provide feedback to MU rate control module 215 and MU grouping module 210 of AP 105. P3 may provide feedback to MU grouping module 210 of AP 105.

The probability P1, for example, may indicate that there may be a high probability of high bursty interference on the channel. This may be used to control the aggressiveness of the rate control process. For example, even though there may be high PER for a client device, rate control may not shift down its rates because it received feedback that this may be due to high bursty interference (and the general PER should not be affected at times when the interferer is not present).

Consistent with embodiments of the disclosure, a feedforward neural network with one or two hidden layers with sigmoid activation functions may be used by classifier model 205. Feedback for the error during the training phase may be provided using back propagation. A gradient descent based approach may then be used to converge to a solution. After this, classifier model 205 may be trained over data skimmed over a Wireless Local Area Network (WLAN) with known conditions as described in greater detail below.

In addition, instead of a neural network, a linear model based implementation may be used for classifier model 205. A linear model may be trained to estimate the likelihood of any event occurring. Define:

$y\_i$: the likelihood of an event occurring at the i-th observation, the value of 1 indicating the event happens, and the value of 0 indicating the event does not happen;

$x\_ij$: the observed state of the j-th slot in the i-th observation. $x\_i\_j$ can be mapped from TPBMP;

alpha_j: the linear coefficient of the j-th slot; and beta: a constant in the linear model.

The linear model may be defined as: $y\_i = \text{sum\_over\_j} (x\_i\_j * \text{alpha}\_j) + \text{beta}$. Training the model may comprise finding the coefficients {alpha_j} and beta given a set of known data {$y\_i = 1$ or 0, $x\_i\_j$ mapped from PER observations}. A least square approach may be used to find the optimal coefficients. Then the trained model may be used to compute $y\_i$ at each observation when {$x\_i\_j$} are collected.

Classifier model 205 may be trained in a lab environment prior to deployment. The lab environment may be an isolated environment with minimal interference (e.g., a shielded room that blocks outside Radio Frequency (RF) signals). In this isolated environment, the channel effects (e.g., the four channel effects described above) may be introduced/injected while AP 105 transmits to plurality of clients 115. Classifier model 205 may receive the TPBMP metrics along with the other inputs described above, and may be notified which channel effect was being introduced. In this way, classifier model 205 may be trained by correlating the inputs with known introduced channel effects.

For example, a signal generator may be used to repeatedly inject bursty interference into the lab environment. With classifier model 205 knowing when the bursty interference was introduced and observing the packet error characteristic of each client (along with any other inputs such as sounding time), it may be trained to be able to classify bursty interference when given future inputs while running in a deployed network. Training processes for the other channel effects are described above in TABLE 1.

Classifier model 205 may also be trained while it is being used in a deployed network. This may be done by feeding back the DL MU performance gain (e.g., PER) that was actually experienced after the DL MU optimization was made (based on the channel effect classifier output) with the expected performance gain resulting from that optimization. If the gain is much different than expected, it may indicate that the channel effect classifier was incorrect in identifying the channel effect, which may then be used to train classifier model 205 to avoid making that mistake again given similar inputs.

For example, if classifier model 205 identifies that a high Doppler shift was probable based on its inputs, TX beamforming module 220 may reduce the sounding interval for the corresponding DL MU group, as this may improve the PER of the DL MU transmissions to that group. If the sounding interval is reduced, but there is no PER gain, this may indicate that the high Doppler shift classification was incorrect, which may be fed back into classifier model 205 to train it.

Figure 5:
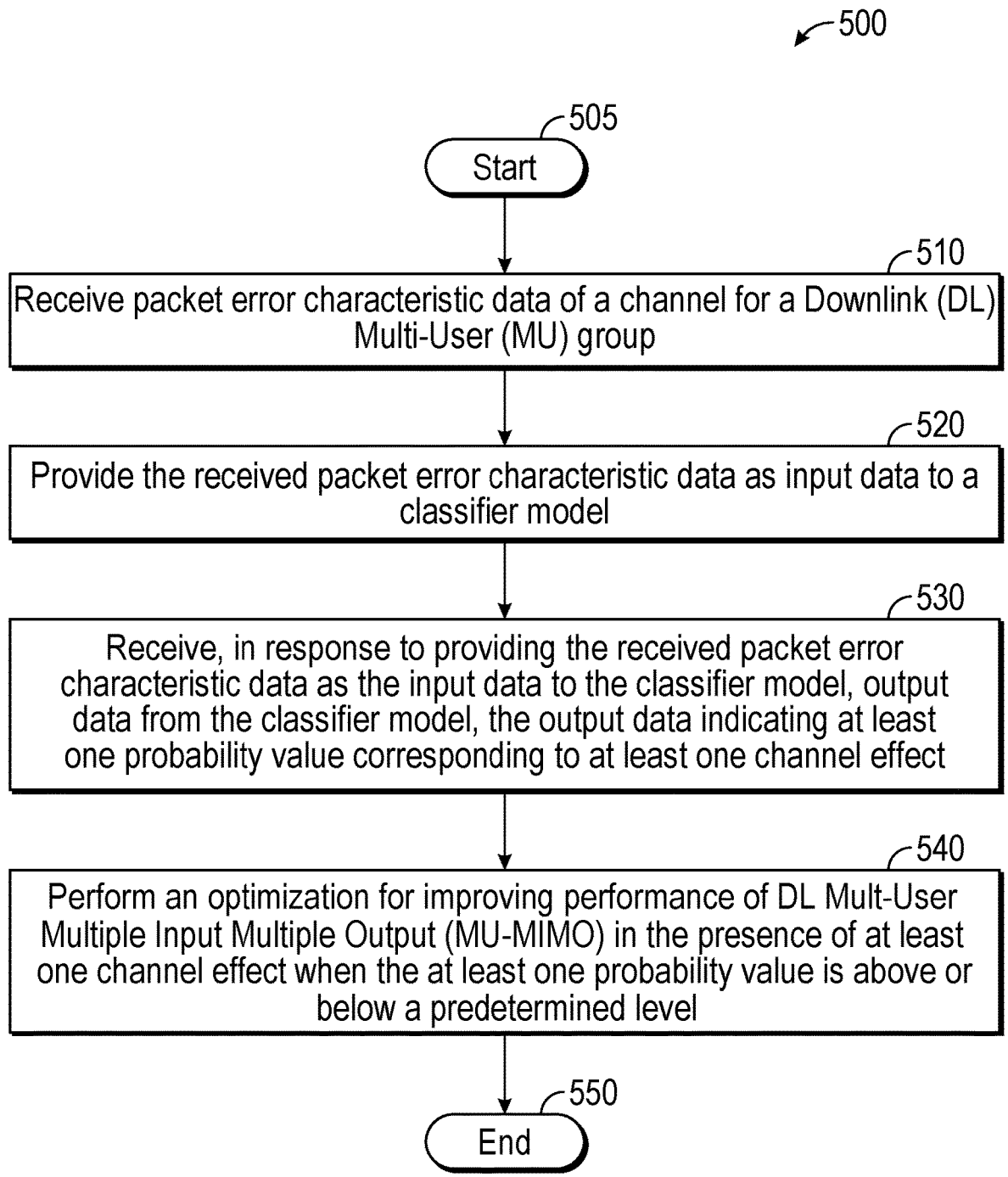
FIG. 5 is a flow chart of a method for providing pattern recognition and classification of packet error characteristics for Multi-user Multiple Input Multiple Output (MU-MIMO) optimization.

FIG. 5 is a flow chart setting forth the general stages involved in a method 500 consistent with an embodiment of the disclosure for providing pattern recognition and classification of packet error characteristics for MU-MIMO optimization. Method 500 may be implemented using AP 105 as described in more detail above with respect to FIG. 1. Ways to implement the stages of method 500 will be described in greater detail below.

Method 500 may begin at starting block 505 and proceed to stage 510 where access point 105 may receive packet error characteristic data of a channel for a Downlink (DL) Multi-user (MU) group. For example, classifier model 205 may already be trained. Method 500 may be triggered by an event, for example, a timer going off after a certain interval (e.g., the sounding interval). The packet error characteristic data may be taken from AP 105 measurements and configurations. The packet error characteristic data may comprise, but are not limited to, the measured TPBMP, overall PER, and sounding time, along with the configured sounding interval and MU group selection.

From stage 510, where access point 105 receives the packet error characteristic data of the channel for the DL MU group, method 500 may advance to stage 520 where access point 105 may provide the received packet error characteristic data as input data to classifier model 205. For example, the inputs may be loaded into classifier model 205.

Once access point 105 provides the received packet error characteristic data as input data to classifier model 205 in stage 520, method 500 may continue to stage 530 where access point 105 may receive, in response to providing the received packet error characteristic data as the input data to classifier model 205, output data from classifier model 205. The output data may indicate at least one probability value corresponding to at least one channel effect. For example, for each client (e.g., each client device in the MU group), classifier model 205 input data may be used to determine the output data, which may be the probabilities of each channel effect being present.

After access point 105 receives the output data from classifier model 205 in stage 530, method 500 may proceed to stage 540 where access point 105 may perform an optimization for improving performance of DL MU-MIMO in the presence of the at least one channel effect when the at least one probability value is above or below a predetermined level. For example, output probabilities may be fed into MU grouping module 210, MU rate control module 215, and TX beamforming module 220 that may use them to perform appropriate optimizations for improving the MU performance. Example optimizations may be described above with respect to TABLE 1. Once access point 105 performs the optimization for improving performance of DL MU-MIMO in the presence of the at least one channel effect when the at least one probability value is above or below a predetermined level in stage 540, method 500 may then end at stage 550.

Figure 6:
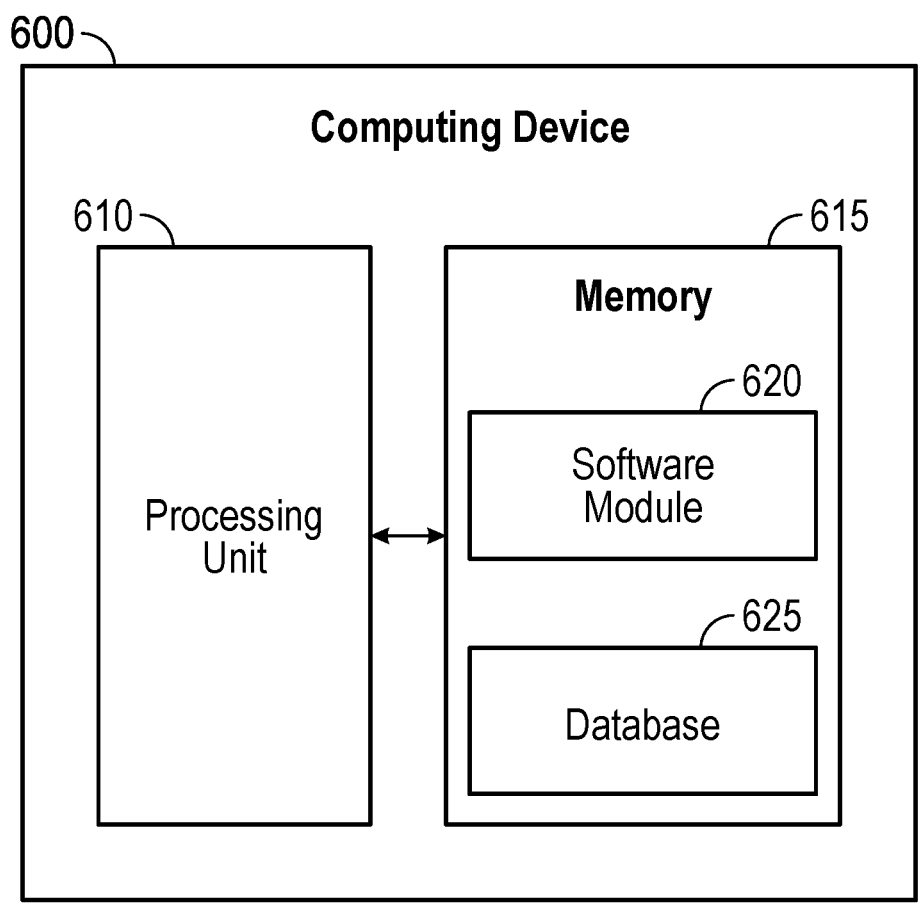
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for providing pattern recognition and classification of packet error characteristics for MU-MIMO optimization, including for example, any one or more of the stages from method 500 described above with respect to FIG. 5. Computing device 600, for example, may provide an operating environment for AP 105, individual client devices of plurality of client devices 115, classifier model 205, MU grouping module 210, MU rate control module 215, and TX beamforming module 220. AP 105, plurality of client devices 115, classifier model 205, MU grouping module 210, MU rate control module 215, and TX beamforming module 220 may operate in other environments and is not limited to computing device 600.

Computing device 600 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a computing device, packet error characteristic data of a channel for a Downlink (DL) Multi-user (MU) group;
   providing the received packet error characteristic data as input data to a classifier model;
   receiving, in response to providing the received packet error characteristic data as the input data to the classifier model, output data from the classifier model, wherein receiving the output data from the classifier model comprises receiving the output data comprising a vector of probabilities corresponding to a set of known channel effects, and wherein each probability value in the vector of probabilities indicates a likelihood of occurrence of a corresponding known channel effect of the set of known channel effects; and
   performing an optimization for improving performance of DL Multi-user Multiple Input Multiple Output (MU-MIMO) in the presence of at least one known channel effect when at least one probability value corresponding to the at least one known channel is one of the following: above a predetermined level and below the predetermined level.

2. The method of claim 1, wherein receiving the packet error characteristic data comprises receiving the packet error characteristic data comprising at least one of the following: a sounding interval; a sounding time; MU grouping information; and an overall Packet Error Rate (PER).

3. The method of claim 1, wherein receiving the packet error characteristic data comprises receiving the packet error characteristic data comprising Timed PER Bitmap (TPBMP) metrics.

4. The method of claim 1, wherein receiving the output data from the classifier model comprises receiving the output data from the classifier model indicating the at least one probability value corresponding to the at least one known channel effect comprising high Doppler shift.

5. The method of claim 1, wherein receiving the output data from the classifier model comprises receiving the output data from the classifier model indicating the at least one probability value corresponding to the at least one known channel effect comprising high bursty interference.

6. The method of claim 1, wherein receiving the output data from the classifier model comprises receiving the output data from the classifier model indicating the at least one probability value corresponding to the at least one known channel effect comprising at least one of the following: significant slow fading; high white noise; and high persistent interference.

7. The method of claim 1, wherein receiving the output data from the classifier model comprises receiving the output data from the classifier model indicating the at least one probability value corresponding to the at least one known channel effect comprising poor MU group selection.

8. The method of claim 1, wherein performing the optimization comprises performing the optimization using at least one of the following: an MU grouping module; an MU rate control module; and a Transmit (TX) beamforming module.

9. The method of claim 1, wherein providing the received packet error characteristic data as the input data to the classifier model comprises providing the received packet error characteristic data as the input data to the classifier model wherein the classifier model was previously trained by correlating training inputs with a known introduced training channel effect in an isolated environment.

10. The method of claim 1, wherein providing the received packet error characteristic data as the input data to the classifier model comprises providing the received packet error characteristic data as the input data to the classifier model wherein the classifier model was previously trained while being used in a deployed network.

11. A system comprising:
   a memory storage; and
   a processing unit coupled to the memory storage, wherein the processing unit is operative to:
   receive packet error characteristic data of a channel for a Downlink (DL) Multi-user (MU) group;
   provide the received packet error characteristic data as input data to a classifier model;
   receive, in response to providing the received packet error characteristic data as the input data to the classifier model, output data from the classifier model, the output data comprising a vector of probabilities corresponding to a set of known channel effects, wherein each probability value in the vector of probabilities indicates a likelihood of occurrence of a corresponding known channel effect of the set of known channel effects; and
   perform an optimization for improving performance of DL Multi-user Multiple Input Multiple Output (MU-MIMO) in the presence of at least one known channel effect when at least one probability value corresponding to the at least one known channel is one of the following: above a predetermined level or below the predetermined level.

12. The system of claim 11, wherein the packet error characteristic data comprises at least one of the following: a sounding interval; a sounding time; MU grouping information; and an overall Packet Error Rate (PER).

13. The system of claim 11, wherein the packet error characteristic data comprises Timed PER Bitmap (TPBMP) metrics.

14. The system of claim 11, wherein the at least one channel effect comprises one of the following: high Doppler shift; high bursty interference; significant slow fading, high white noise, and/or high persistent interference; and poor MU group selection.

15. The system of claim 11, wherein the processing unit being operative to perform the optimization comprises the processing unit being operative to perform the optimization using at least one of the following: an MU grouping module; an MU rate control module; and a Transmit (TX) beamforming module.

16. A non-transitory computer-readable medium that stores a set of instructions which when executed perform a method comprising:

receiving, by a computing device, packet error characteristic data of a channel for a Downlink (DL) Multi-user (MU) group;

providing the received packet error characteristic data as input data to a classifier model;

receiving, in response to providing the received packet error characteristic data as the input data to the classifier model, output data from the classifier model, the output data comprising a vector of probabilities corresponding to a set of known channel effects, wherein each probability value in the vector of probabilities indicates a likelihood of occurrence of a corresponding known channel effect of the set of known channel effects; and performing an optimization for improving performance of DL Multi-user Multiple Input Multiple Output (MU-MIMO) in the presence of at least one known channel effect when at least one probability value corresponding to the at least one known channel is one of the following: above a predetermined level and below the predetermined level.

17. The non-transitory computer-readable medium of claim 16, wherein receiving the packet error characteristic data comprises receiving the packet error characteristic data comprising at least one of the following: a sounding interval; a sounding time; MU grouping information; and an overall Packet Error Rate (PER).

18. The non-transitory computer-readable medium of claim 16, wherein receiving the packet error characteristic data comprises receiving the packet error characteristic data comprising Timed PER Bitmap (TPBMP) metrics.

19. The non-transitory computer-readable medium of claim 16, wherein providing the received packet error characteristic data as the input data to the classifier model comprises providing the received packet error characteristic data as the input data to the classifier model wherein the classifier model was previously trained by correlating training inputs with a known introduced training channel effect in an isolated environment.

20. The non-transitory computer-readable medium of claim 16, wherein providing the received packet error characteristic data as the input data to the classifier model comprises providing the received packet error characteristic data as the input data to the classifier model wherein the classifier model was previously trained while being used in a deployed network.

* * * * *